Nov. 11, 1952　　　L. W. McCLELLAN ET AL　　　2,617,176
STOCK FEED MECHANISM
Filed Sept. 23, 1946　　　　　　　　　　　　　　　4 Sheets-Sheet 1
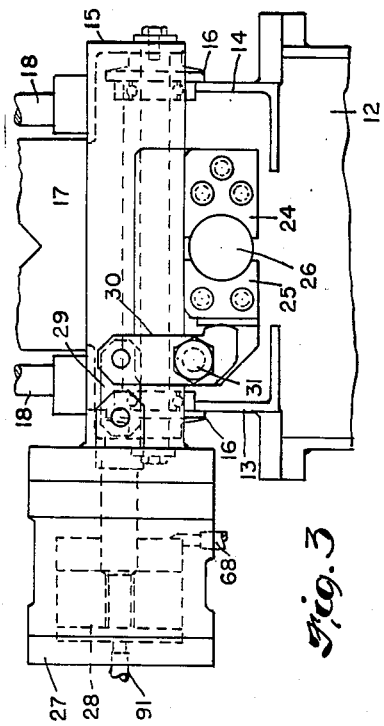
Fig. 3
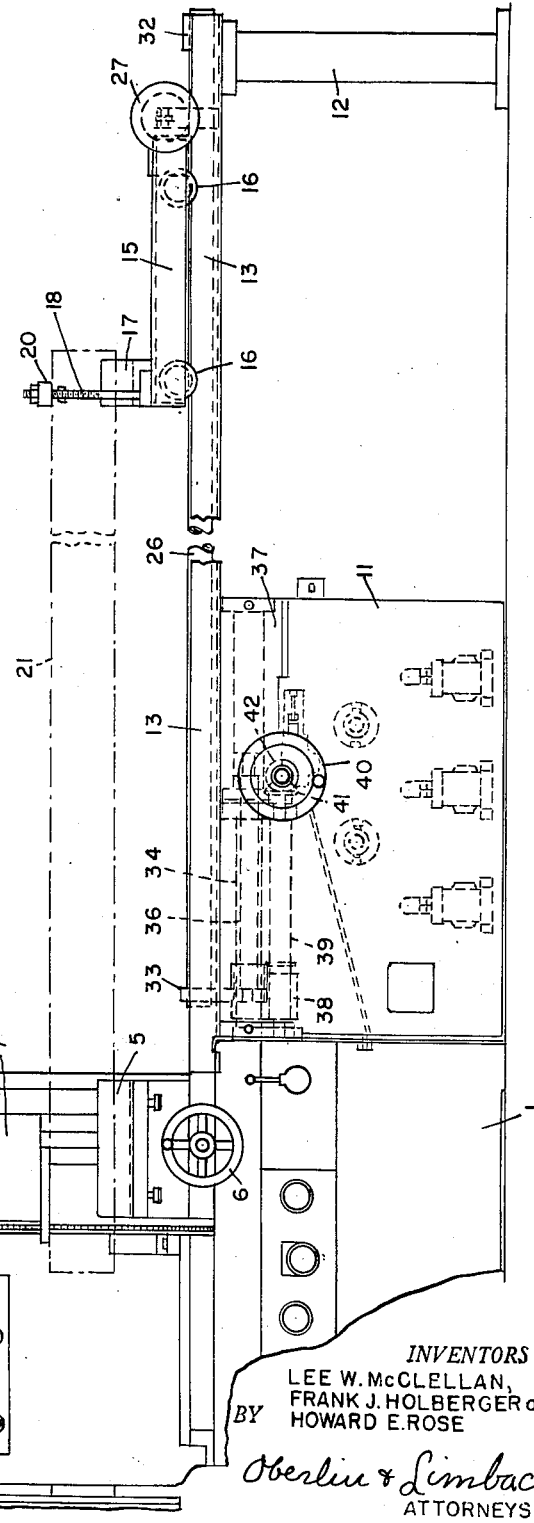
Fig. 1
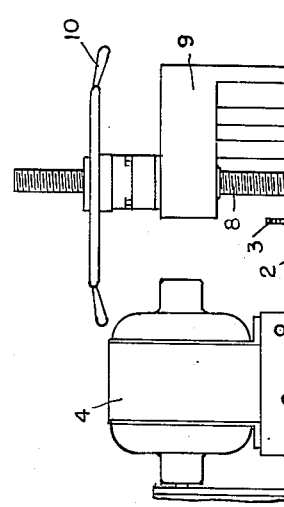
INVENTORS
LEE W. McCLELLAN,
FRANK J. HOLBERGER and
HOWARD E. ROSE
BY Oberlin & Limbach
ATTORNEYS Nov. 11, 1952 L. W. McCLELLAN ET AL 2,617,176
STOCK FEED MECHANISM
Filed Sept. 23, 1946 4 Sheets-Sheet 2

INVENTORS
LEE W. McCLELLAN,
FRANK J. HOLBERGER and
BY HOWARD E. ROSE

Oberlin & Limbach
ATTORNEYS

Nov. 11, 1952 L. W. McCLELLAN ET AL 2,617,176
STOCK FEED MECHANISM
Filed Sept. 23, 1946 4 Sheets-Sheet 3

INVENTORS
LEE W. McCLELLAN,
FRANK J. HOLBERGER and
BY HOWARD E. ROSE

Oberlin + Limbach
ATTORNEYS

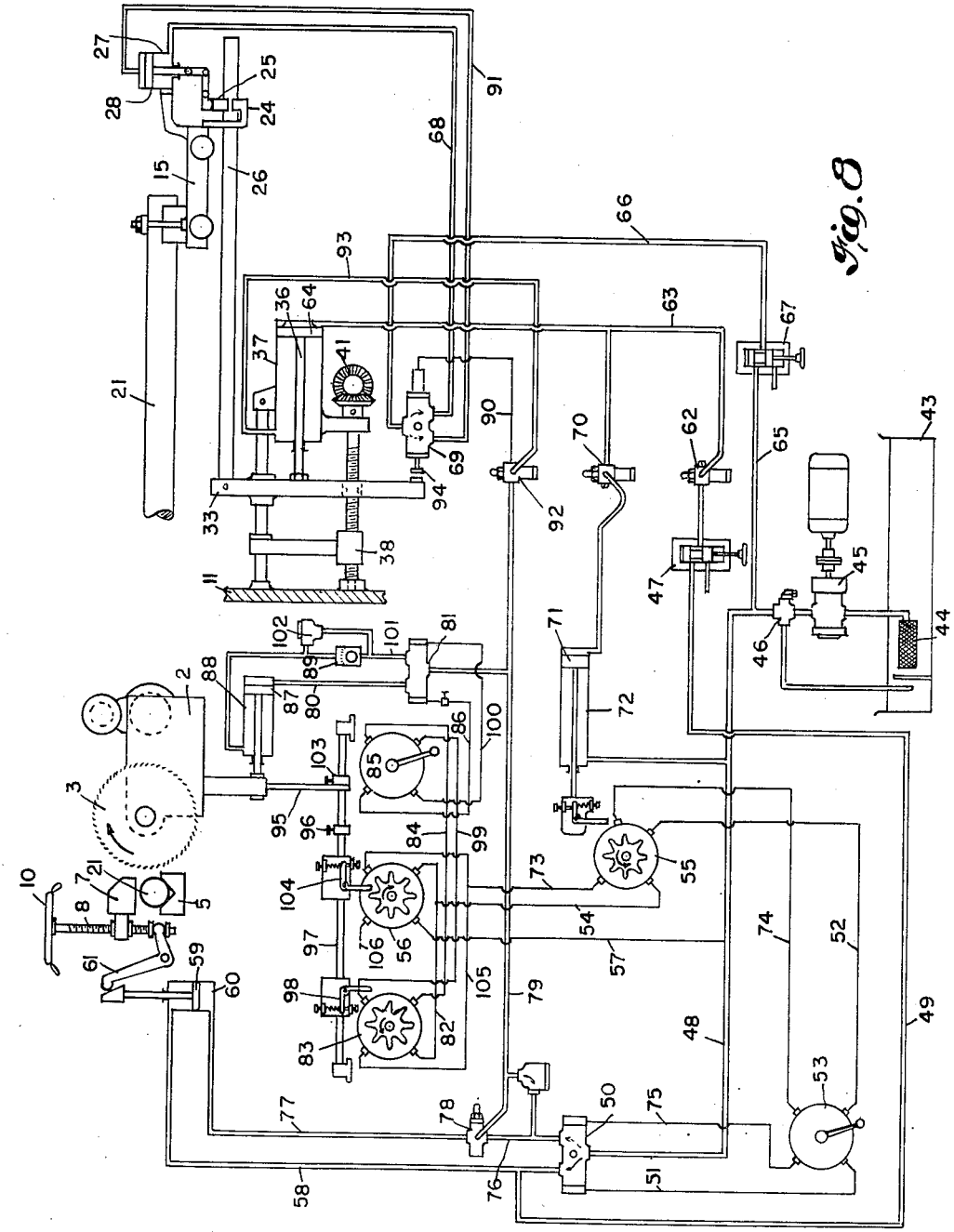

Patented Nov. 11, 1952

2,617,176

UNITED STATES PATENT OFFICE 2,617,176

STOCK FEED MECHANISM

Lee W. McClellan, Willoughby, Frank J. Holberger, Cleveland, and Howard E. Rose, Peninsula, Ohio, assignors to The Motch & Merryweather Machinery Co., Cleveland, Ohio, a corporation of Ohio Application September 23, 1946, Serial No. 698,788

8 Claims. (Cl. 29—69)

1

This invention relates, as indicated to stock feed mechanism and more particularly to such mechanism adapted to be used in conjunction with metal sawing machines of the type described in Patent No. 2,327,920 to J. G. Moohl, for example.

In such sawing machines it has been conventional practice to provide an adjustable stop adapted to be swung into position to engage the end of the bar stock or other work piece to gauge the length to be cut off by the saw. Automatic feed means have been employed to intermittently advance the work into engagement with such stop as sections are cut off therefrom, including reciprocating gripper means which repeatedly seize and advance such work. In attempting thus to render the machine entirely automatic in operation various problems have been encountered. When only a very thin cut is taken from the stock the cut off piece may fail to fall over into the discharge chute but instead remain in place, preventing the gauging stop from swinging up into position. The automatic operation of the machine may thus be blocked. A similar difficulty is encountered when chips from the saw interfere with the operation of the stop, requiring clearance by the operator. When reciprocating stock gripping means are employed to advance the work the jaws of such means tend to dent and mar the work. Furthermore, such jaws must frequently be changed when different sizes and shapes of stock are employed.

It is, therefore, a primary object of our invention to provide a stock feed mechanism adapted to automatic operation which will avoid each of the difficulties enumerated above.

Other objects will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a front elevational view of a rotary metal sawing machine with the stock feeding mechanism of our invention arranged to cooperate therewith;

Fig. 3 is a detail end elevational view of the carriage means adapted to support the workpiece;

Fig. 8 is a diagrammatic layout of the fluid pressure means which may be employed to operate such mechanism.

Figure 2:
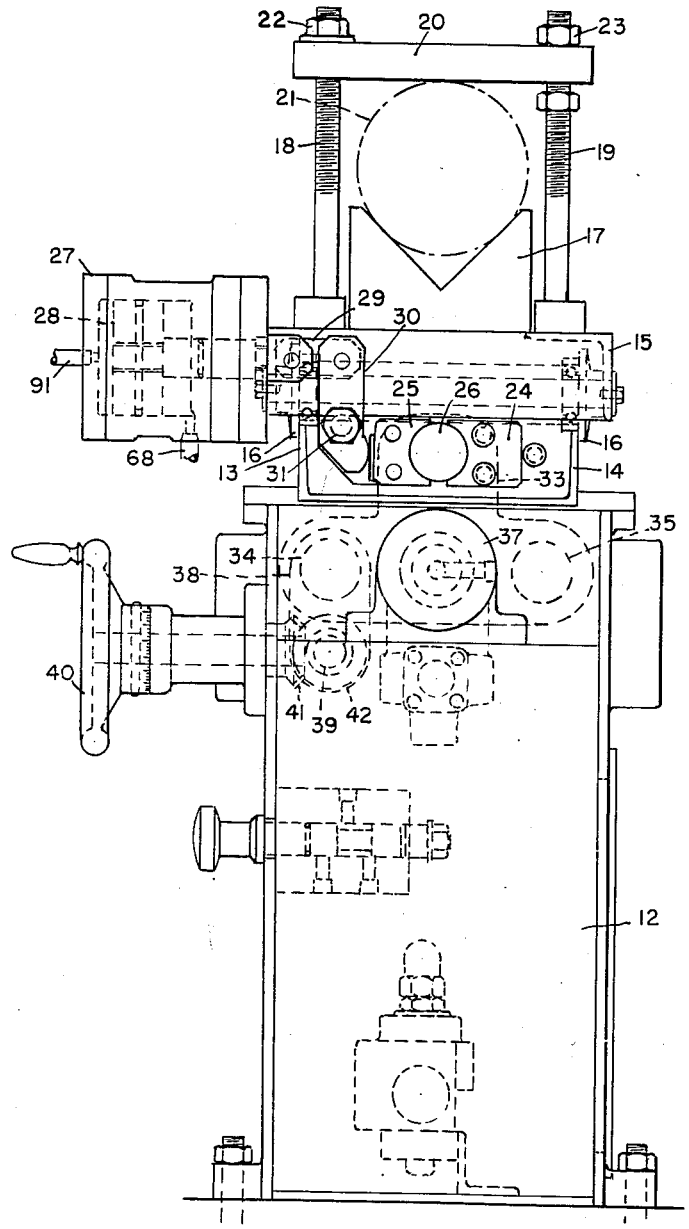
Fig. 2 is an end elevational view of such stock feeding mechanism.
Figure 4:
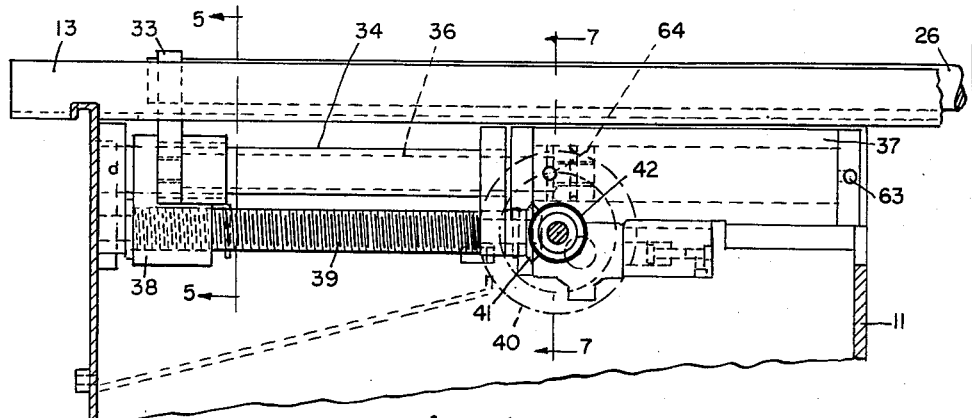
Fig. 4 is an enlarged fragmentary view of the means for regulating the reciprocation of such carriage.
Figure 5:
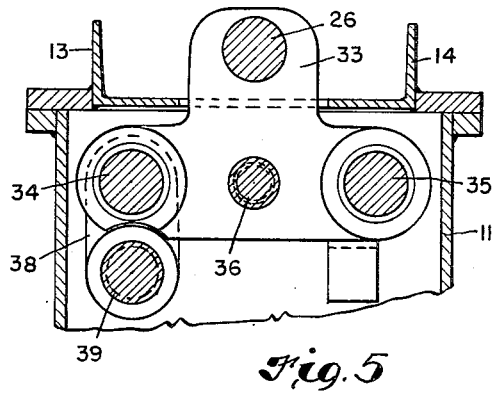
Fig. 5 is a cross-sectional view taken along the line 5—5 on Fig. 4.
Figure 6:
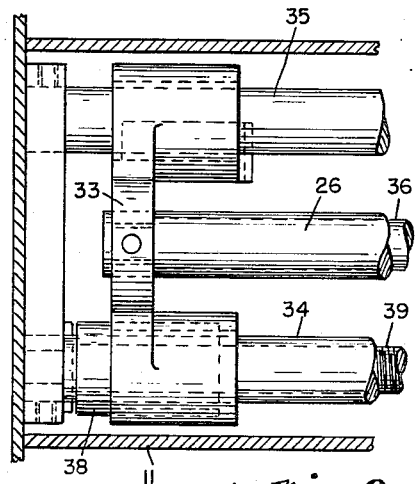
Fig. 6 is a top plan view of the portion of the mechanism illustrated in Fig. 5.
Figure 7:
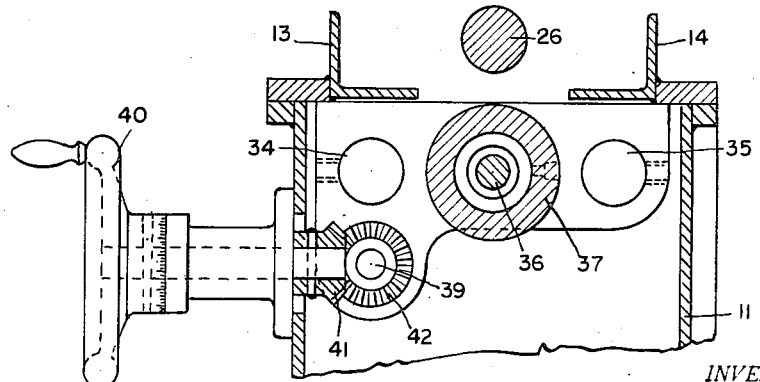
Fig. 7 is a cross-sectional view taken along the line 7—7 on Fig. 4.

Referring now more particularly to such drawings and especially to Figs. 1 and 2, such figures show the stock feed mechanism of our invention employed with a cold sawing machine. Such sawing machine comprises a heavy base 1 of box construction on which is mounted a saw carriage 2 for reciprocation relative to such base. Such saw carriage contains the entire drive to the saw blade 3, electric motor 4 furnishing the requisite power. A work holding clamp or vice is provided adjacent such saw 3 comprising a lower jaw 5 which is horizontally adjustable by means of hand wheel 6 and an upper jaw 7 carried by threaded shaft 8 mounted in massive bracket member 9. Such latter jaw is vertically adjustable by means of hand wheel 10.

Supported by auxiliary frame 11 and end stand 12 is a trackway formed by two longitudinal angle members 13 and 14 in alignment with the work holding vise formed by jaws 5 and 7 and extending at right angles to saw blade 3.

As best shown in Figs. 2 and 3 a carriage 15 is mounted on wheels 16 for travel along such track or guideway. The forward end of such carriage carries work gripping means comprising a lower jaw 17 between two vertically extending bolt members 18 and 19 and a cross bar 20 adapted to secure the end portion of a work piece 21 when drawn down by tightening nuts 22 and 23.

The rear portion of such carriage is provided with a fixed clamping jaw 24 adapted to cooperate with horizontally movable clamping jaw 25 to seize and firmly grip a longitudinally reciprocable bar 26 extending between such track members 13 and 14. Such jaw 25 is adapted to be moved into such clamping engagement by means of a double acting fluid pressure cylinder 27 in which piston 28 moves, operating through link 29 to swing lever 30 about its pivotal mounting 31.

Said reciprocable bar 26 is supported for sliding movement in bearing 32 and at the other end by a bracket member 33 which is sleeved to slide on parallel supporting rods 34 and 35 mounted in frame 11. As best shown in Figs. 4 to 7 another rod or piston 36 is connected to member 33 and is adapted to be reciprocated by action of a double acting cylinder 37 thereby likewise reciprocating bar 26. The extent of such reciprocation is limited by means of an adjustable stop 38 which slides along rod 34 and is positioned as desired along such rod by rotation of threaded shaft 39 by means of hand wheel 40 and through bevel gears 41 and 42.

The manner in which the above described mechanism operates may now be described. The work piece 21, which may be bar stock or tubing, for example, is clamped as shown in Fig. 1 for longitudinal movement with carriage 15. The other end of the work piece rests on lower jaw 5 of the work holding vise of the sawing machine. Jaw 25 is actuated to grip reciprocable bar 26 and such bar is then advanced through action of cylinder 37 and piston rod 36 to the extent permitted by stop 38. Vise jaw 7 is then lowered to firmly clamp the stock adjacent the saw blade and a trimming cut is taken. Meanwhile, jaw 25 is caused to release its grip on bar 26 and such bar is reciprocated to return it to its original position when it is again seized between jaws 25 and 24. Jaw 7 then releases the stock which is again fed forward as before and the next cut taken. This cycle is repeated until the stock has been consumed. It will be noted that very long lengths of stock may thus be employed extending rearwardly of carriage 15, it being only necessary to release clamping bar 20 and advance the stock returning the carriage to the end of the trackway when that portion of the stock between the carriage and the saw has been consumed. Otherwise, the action of our feed mechanism may be entirely automatic.

Such automatic operation of the feed mechanism in conjunction with automatic operation of the sawing machine may be achieved by employment of the fluid pressure system illustrated diagrammatically in Fig. 8 of the drawing.

As shown in such drawing, hydraulic fluid is drawn from a sump 43 through strainer 44 by pump 45. Relief valve 46 is provided to protect the system from excessive pressure. The arrangement of the system may best be described by explaining a complete operating cycle. The cycle is started by pushing valve 47, pressure line 48 being connected with line 49 through four-way valve 50, the spool of such valve being so shifted by fluid pressure in control line 51 in turn connected with control line 52 through control valve 53. Control line 52 is connected with control line 54 through valve 55 and line 54 is connected through control valve 56 with pilot pressure take-off line 57 which is in turn connected with said main pressure line 48. It will be seen from an inspection of the drawing that line 58 will be under pressure at this time leaving piston 59 in double acting cylinder 60, and through bell crank 61 releasing the clamping pressure of jaw 7 of the column clamp on the work piece 21.

When valve 47 has been thus moved, pressure builds up in line 49 sufficiently to open pressure valve 62 and likewise place line 63 under pressure. This causes piston 64 to be moved the length of cylinder 37 or such shorter distance as may be permitted by adjustable stop 38, bar 26 being reciprocated therewith. During such forward or feeding movement of bar 26 jaws 24 and 25 will firmly grasp the same, causing carriage 15 and the stock 21 to be likewise advanced. Pressure line 65 is connected with line 66 through push valve 67, and line 66 with line 68 through four-way valve 69, so that piston 28 is moved in cylinder 27 to operate clamping jaw 25.

When piston 64 in cylinder 37 reaches as far forward as stop 38 permits, pressure builds up in line 63 sufficient to open pressure valve 70 and move piston 71 in pilot cylinder 72. When piston 71 reaches forward it rotates control valve 55, connecting line 52 with relief line 73 and line 54 (under pressure) with line 74, such latter line being connected with line 75 through valve 53. The effect of thus relieving pressure in line 51 and instead placing line 75 under pressure is to shift valve 50, connecting lines 49 and 58 with relief (not shown, leading to sump 43), and connecting pressure line 48 with lines 76 and 77. This obviously causes piston 59 in cylinder 60 to be moved to clamp the work piece 21 adjacent saw 3.

When such piston 59 has moved as far as possible and the work piece is firmly clamped, pressure builds up in line 77 sufficient to overcome pressure valve 78 and place line 79 under pressure. Line 79 is in communication with line 80 through four-way valve 81 as may be seen by tracing the valve control lines. Pilot pressure take-off line 57 is connected through valve 56 with line 82 which in turn is connected through valve 83 with line 84. Line 84 connects through valve 85 with line 86, placing such line under pressure and thereby operating valve 81 to connect lines 79 and 80.

Pressure in line 80 is effective to move piston 87 in saw carriage operating cylinder 88 to advance such carriage and saw to cut off a section from the work piece 21. The rate of movement of such piston and carriage is regulated by an adjustable feed control valve 89 which limits the flow of the hydraulic fluid to relief (not shown).

While the column clamp jaws 5 and 7 are holding the work piece and the saw carriage is advancing to make the cut jaws 24 and 25 are caused to release bar 26. The pressure in line 79 is transmitted to control line 90 which shifts valve 69 to connect pressure line 66 with line 91, thereby reciprocating piston 28 in cylinder 27 to cause jaw 25 to release bar 26, and connecting line 68 to relief (not shown).

Piston 71 in pilot cylinder 72 was previously shifted from right to left as viewed in Fig. 8 by an overbalancing of pressures, the area of piston head subject to pressure being larger to the right than to the left where the piston rod is attached. Such piston is now returned to the right since, as above explained, line 49 and therefore also line 63 is connected to relief. Valve 55 is, however, not affected by such return of piston 71.

At the same time, since line 63 is open to relief and the pressure in line 79 overcomes pressure valve 92, fluid pressure is admitted to line 93 and piston 64 is returned to the right, reciprocating bar 26 to which it is connected, such bar sliding between now open jaws 24 and 25 on carriage 15. It should be noted that valves 92, 70 and 62 are all pressure sequence valves with checks to allow free flow in the opposite direction.

With the return of piston 64 to the right in cylinder 37, plunger 94 is depressed, shifting valve 69 to again connect pressure line 66 with line 68 and tank to line 91, thereby actuating cylinder 27 to cause jaws 24 and 25 to seize bar 26. Carriage 15 is thus again attached to reciprocating bar 26 ready to advance work piece 21 when such bar is again advanced.

As the saw carriage reaches forward, having completed the cut, depending finger 95 engages stop 96 and shifts rod 97 causing finger 98 to turn valve 83. Such rotation of valve 83 is effective to connect pressure line 82 with line 99 and line 84 with line 73 (which is on tank). Line 99 communicates through valve 85 with line 100, pressure in which serves to shift valve 81 to connect line 80 to relief (not shown), and line 101 to line 79 which is under pressure. Fluid pressure passing through line 101 passes through check valve 102 in preference to feed control valve 89, causing rapid return of piston 87 in cylinder 88 with resultant rapid return of the saw carriage.

As the saw carriage returns, finger 95 engages stop 103, shifting rod 97 to the right and causing finger 104 to turn valve 56. This serves to connect pilot pressure take-off line 57 with line 105 which has now been connected with line 84 which in turn connects with line 86. Line 82 is now connected through valve 56 with relief 106. Lines 99 and 100, in communication therewith, are thereby connected to relief, the saw carriage having now been sufficiently returned. Line 54, which also connects directly with line 82, communicates through valve 55 with lines 74 and 75, permitting valve 50 to be shifted by pressure in line 51 to connect pressure line 48 with line 58, thereby moving piston 59 in cylinder 60 to release the grip of jaw 7 on the work piece 21. That control line 51 is under pressure and therefore enabled thus to shift valve 50 may be seen by tracing back through lines 52, valve 55, and line 73 which connects to line 105 which is under pressure as above explained.

This shifting of valve 50 likewise admits pressure to line 49 and piston 64 together with auxiliary feed bar 26 will again be advanced in the manner above explained, the cycle being automatically repeated.

It will be seen from the foregoing that the cycle of operation may be divided into a series of steps, certain of which may be substantially simultaneous. First the feed carriage moves forward, feeding the work piece into cut-off position. Then the pilot cylinder operates to turn valve 55. Then jaws 5 and 7 of the column clamp seize the work piece. Then the saw carriage begins to advance. While the saw carriage thus advances, jaws 24 and 25 of the feed carriage release their hold on reciprocable auxiliary feed bar 26, such bar returns to its original position, and the pilot cylinder returns. Then the feed carriage clamp again grips bar 26. By pulling start valve 47 at this stage of the operation the mechanism will be caused to stop automatically after the saw carriage has returned and jaws 5 and 7 of the column clamp opened.

In setting up the machine, valve 67 may be manually operated to reset the feed carriage clamp, valve 53 to set the column clamp, and valve 85 to set the saw carriage. The hydraulic fluid employed in the system may be selected from those commercially available, including those consisting primarily of petroleum oils.

The mechanism above described is therefore fully automatic in operation while being readily adjustable by manual means. Obviously the same fluid pressure system can be employed without such automatic control means, the various operations being controlled instead by manipulation of the various valves. The disadvantages encountered with the usual feeding and gauging means are avoided and a machine provided which not only is capable of automatic operation with a minimum of supervision but which also will not jam or cause damage to the machine or work.

Other modes of applying the principle of the invention may be employed, change being made as regards the details described, provided the features stated in any of the following claims or the equivalent of such be employed.

We therefore particularly point out and distinctly claim as our invention:

1. A device for intermittently advancing an extended piece into working position comprising a straight guide-way, work gripping means mounted for movement along said guide-way and adapted firmly continuously to hold one end of the work piece throughout the entire operation, clamping means at one end of said guide-way adjacent such working position operative to hold such work piece, an elongated member mounted for axial reciprocation closely parallel to said guide-way, means operative to reciprocate said member, means operative to adjustably limit the extent of such reciprocation, means operative releasably to engage said work gripping means to said elongated member for movement of said member toward such working position, and control means operative to actuate said clamping means to grip such work-piece and hold the same during movement of said member away from such working position, and to release such work-piece during movement of said member toward such working position to permit the work-piece to be advanced.

2. A device for intermittently advancing an extended work piece into working position comprising a straight guide-way, work gripping means mounted for movement along said guide-way and adapted firmly continuously to hold one end of the work piece furthest from such working position throughout the entire operation, clamping means at one end of said guide-way adjacent such working position operative to hold such work piece, an elongated member mounted for axial reciprocation closely parallel to said guide-way, means operative to reciprocate said member, spaced stops limiting the extent of such reciprocation, means for adjusting one of said stops to vary the extent of reciprocation permitted, means operative releasably to engage said work gripping means to said elongated member throughout the movement of said member toward such working position, and control means operative to actuate said clamping means to grip such work-piece and hold the same during movement of said member away from such working position, and to release such work-piece during movement of said member toward such working position to permit the work-piece to be advanced.

3. A device for intermittently advancing a work piece comprising a guide-way, work gripping means mounted for movement along said guide-way, an elongated member mounted for reciprocation closely parallel to said guide-way, means adapted to reciprocate said member a distance equal to the desired unit feed of such work piece, means operative to engage said work gripping means directly to said reciprocating member during movement of said member in one direction and to disengage said work gripping means and reciprocating member during movement of said member in the other direction, and fixed clamping means operative, in timed relation to such reciprocation of said elongated member, to grip such work-piece and hold the same during movement of said elongated member in such other direction, and to release such work-piece during movement of said elongated member in such one direction to permit the work-piece to be advanced.

4. For use in combination with a metal sawing machine or the like, a device for intermittently advancing an extended work piece of uniform cross section into position for successively cutting off a number of sections of uniform length, said device comprising a straight trackway disposed transversely of the traverse of the saw of such sawing machine, work gripping means mounted for movement along said trackway and adapted to support one end of such work piece, clamping means adjacent such saw operative to hold such work piece adjacent the end section to be cut off, fluid pressure operated means adapted to open and close said clamping means, an elongated member parallel to said track-way, fluid pressure operated means adapted to reciprocate said member, means operative adjustably to limit the extent of such reciprocation, fluid pressure operated means operative to engage said work gripping means to said elongated member during the movement of said member toward such working position, and means controlling said fluid pressure operated means adapted to open and close said clamping means operative to open said clamping means adjacent such saw during such movement to permit the work piece to be advanced into position for the next cut and again to close said clamping means on such work piece after such work piece has been so advanced.

5. A device for intermittently advancing a work-piece comprising a guide-way, work gripping means mounted for movement along said guide-way, reciprocating means parallel to and closely adjacent said guide-way, means operative intermittently to interengage said work gripping means and reciprocating means for movement of said work gripping means along said guide-way in one direction only, and fixed clamping means operative automatically to release such work-piece during movement of said reciprocating means in such one direction to permit such work-piece to be advanced, and to grip such work-piece and hold the same during movement of said reciprocating means in the opposite direction.

6. A device for intermittently advancing a length of stock into working position comprising a straight guide-way, stock gripping means mounted for movement along said guide-way, a rigid elongated member mounted for reciprocation parallel to and adjacent said guide-way, means operative to reciprocate said member, means operative to engage said stock gripping means directly to said elongated member during movement of said member in one direction only, and fixed clamping means operative, in timed relation to such reciprocation of said elongated member, to release such length of stock during movement of said elongated member in such one direction to permit such work-piece to be advanced, and to grip such length of stock and hold the same during movement of said elongated member in the opposite direction.

7. A device for intermittently advancing a length of stock toward a work station, comprising a straight guide-way, stock gripping means mounted for movement along said guide-way and adapted to grip such stock continuously during the advance thereof toward such work station, a rigid elongated member of substantially the same length as said guide-way mounted for axial reciprocation closely parallel thereto, means operative to reciprocate said member, means operative to engage said stock gripping means directly to said rigid elongated member throughout movement of said member toward such work station and to disengage said gripping means from said rigid elongated member throughout return reciprocation of the latter, and fixed clamping means operative, in timed relation to such reciprocation of said elongated member, to grip such length of stock and hold the same during such return reciprocation of said elongated member, and to release such length of stock during movement of said elongated member toward such work station to permit the work-piece to be advanced.

8. A device for intermittently advancing a length of stock toward a work station comprising a straight guide-way, a feed carriage mounted for movement along said guide-way, stock gripping means on said feed carriage adapted continuously to grip such stock, a fixed stock clamp adjacent such work station operative to clamp and hold such stock between intermittent advances thereof, a rigid elongated bar mounted for reciprocation parallel to and adjacent said guide-way, means operative to reciprocate said bar, bar gripping means on said feed carriage operative intermittently to grip said bar for movement of said feed carriage along said guide-way toward such work station only, and control means operative to actuate sequentially said bar gripping means to grip said bar, said fixed stock clamp to release the stock, said bar reciprocating means to advance said bar toward such work station, said fixed stock clamp to grip the stock, said bar gripping means to release said bar, said bar reciprocating means to return said bar, and again said bar gripping means to grip said bar for a repetition of the cycle.

LEE W. McCLELLAN.
FRANK J. HOLBERGER.
HOWARD E. ROSE.

REFERENCES CITED

The following references are of record in the file of this patent:

UNITED STATES PATENTS

| Number | Name | Date |
|---|---|---|
| 1,336,501 | Blanckensee | Apr. 13, 1920 |
| 1,939,441 | Einig | Dec. 12, 1933 |
| 2,144,335 | Jensen et al. | Jan. 17, 1939 |
| 2,327,921 | Moohl | Aug. 24, 1943 |
| 2,341,870 | Johnston | Feb. 15, 1944 |
| 2,363,760 | Waldie | Nov. 28, 1944 |

FOREIGN PATENTS

| Number | Country | Date |
|---|---|---|
| 882,492 | France | Mar. 1, 1943 |
| 406,824 | Great Britain | Mar. 8, 1934 |
| 463,312 | Great Britain | Mar. 19, 1937 |